United States Patent
Balasubramanian et al.

(10) Patent No.: US 8,892,929 B2
(45) Date of Patent: *Nov. 18, 2014

(54) REDUCING POWER CONSUMPTION OF UNCORE CIRCUITRY OF A PROCESSOR

(71) Applicant: Intel Corporation, Santa Clara, CA (US)

(72) Inventors: Srikanth Balasubramanian, Santa Clara, CA (US); Tessil Thomas, Bangalore (IN); Satish Shrimali, Bangalore (IN); Baskaran Ganesan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,103

(22) Filed: Feb. 28, 2013

(65) Prior Publication Data

US 2013/0179713 A1    Jul. 11, 2013

Related U.S. Application Data

(63) Continuation of application No. 13/118,757, filed on May 31, 2011.

(51) Int. Cl.
G06F 1/00     (2006.01)
G06F 1/32     (2006.01)

(52) U.S. Cl.
CPC ............ *G06F 1/3237* (2013.01); *G06F 1/3206* (2013.01)
USPC .......................................... 713/323; 713/324

(58) Field of Classification Search
None
See application file for complete search history.

(56) References Cited

U.S. PATENT DOCUMENTS

| 5,708,656 | A  | * | 1/1998  | Noneman et al. | 370/335 |
| 7,434,073 | B2 |   | 10/2008 | Magklis        |         |
| 2008/0052543 | A1 | * | 2/2008 | Sokorac        | 713/300 |
| 2008/0104425 | A1 |   | 5/2008 | Gunther et al. |         |
| 2010/0287394 | A1 | * | 11/2010 | Branover et al. | 713/323 |
| 2011/0055469 | A1 | * | 3/2011 | Natu et al.    | 711/105 |
| 2011/0289332 | A1 | * | 11/2011 | Bondalapati et al. | 713/323 |

FOREIGN PATENT DOCUMENTS

JP     2010211544     9/2010

OTHER PUBLICATIONS

U.S. Appl. No. 12/889,121, entitled, "Providing Per Core Voltage and Frequency Control," filed Sep. 23, 2010, by Pankaj Kumar.
U.S. Appl. No. 13/070,700, entitled, "Obtaining Power Profile Information With Low Overhead," filed Mar. 24, 2011, by Robert Knight.
International Searching Authority, "Notification of Transmittal of the International Search Report and the Written Opinion of the International Searching Authority," mailed Jul. 25, 2012, in International application No. PCT/US2011/067984.

(Continued)

*Primary Examiner* — Paul Yanchus, III
*Assistant Examiner* — Vincent Chang
(74) *Attorney, Agent, or Firm* — Trop, Pruner & Hu, P.C.

(57) ABSTRACT

In one embodiment, a multi-core processor includes multiple cores and an uncore, where the uncore includes various logic units including a cache memory, a router, and a power control unit (PCU). The PCU can clock gate at least one of the logic units and the cache memory when the multi-core processor is in a low power state to thus reduce dynamic power consumption.

18 Claims, 7 Drawing Sheets

(56) References Cited

OTHER PUBLICATIONS

N. Dheemanth, et al., "Westmere-Ex: A 20 Thread Server CPU, Hot Chips 2010," Aug. 22, 2010, 18 pages.

K.J. Hong, et al., "Performance and Power Consumption Improvement of Embedded RISC Core," Journal of ICS, vol. 14, No. 2, Feb. 2010, 9 pages.

Taiwanese Patent Office, Office Action mailed Apr. 10, 2014 in Taiwan application No. 100148033.

Dheemanth Nagaraj, et al., Westmere-EX: A 20 thread server CPU, Hot Chips 2010 p. 10.

* cited by examiner

300

310 → All Cores In Selected Low Power State In All Sockets And Memory In Low Power State 315 Uncore Empty? — N → (loop back)
Y ↓

320 Drain OOB Interface, Set NACK Enable Signal, Disable OOB CLK REQ Assertion, And Start Persistence Timer 325 Persistence Timer Expired? — N → 330 Uncore Empty? — Y → 335 Reset NACK Enable Signal → (back to 310)
330 N → back to 325
Y ↓

340 Uncore Still Empty? — N → back to 310
Y ↓

350 Assert Flow Control To Stop Incoming Transactions At Router Input Port, Start Drain Timer 360 Drain Timer Expired? — N → 365 Uncore Empty? — Y → back to 360
365 N → 370 De-Assert Flow Control Signal → back to 335
Y ↓

375 Uncore Still Empty? — N → 370
Y ↓

380 Assert Clock Gate Enable And Start Clock Gate Timer

385 Clock Gate Timer Expired? — N → loop
Y ↓

390 Set Uncore Clock Gated Status Signal, Reset NACK Enable Signal, And Enable OOB CLK REQ Assertion

FIG. 4

REDUCING POWER CONSUMPTION OF UNCORE CIRCUITRY OF A PROCESSOR

This application is a continuation of U.S. patent application Ser. No. 13/118,757, filed May 31, 2011 the content of which is hereby incorporated by reference.

BACKGROUND

Many of today's processors are implemented in a multi-core form including multiple independent cores and additional logic, often referred to as an "uncore," which contains shared cache memory, controllers, input/output (I/O) circuitry, power control circuitry and so forth. In general, when a processor enters a low power mode of a given level, circuitry of one or more cores can be disabled to reduce power consumption when the cores are not needed to perform useful work. Nonetheless in these modes, such as so-called C-states of an Advanced Configuration and Power Interface (ACPI) Specification (e.g., Rev. 3.0b, published Oct. 10, 2006), the uncore remains fully powered.

As a result of this powered-on feature of the uncore, an undesired amount of power consumption of an overall processor socket can still occur in a low power mode. This is particularly so in certain processors such as server processors in multi-socket platforms, since these devices typically push the envelope in terms of the number of uncore units such as last level cache banks, cache controllers, off-chip links, memory controllers, and so forth. To accommodate this functionality, a significant amount of logic can be present in the uncore which in turn results in a significant amount of dynamic power consumption even when the socket is idle. This is a problem since both customers and regulatory bodies are demanding significant reductions in server idle power consumption.

BRIEF DESCRIPTION OF THE DRAWINGS

FIG. 4 is a flow diagram of a macro clock gating entry flow in accordance with an embodiment of the present invention.

DETAILED DESCRIPTION

Embodiments may provide for reduction in uncore dynamic power when a processor socket is idle, thereby reducing overall server idle power. More specifically, embodiments may enable "Macro Clock Gating" (MCG) to enable a socket's uncore to enter a low power state in which much of the uncore itself can be disabled, e.g., via clock gating. In some embodiments this MCG operation may be entered when it is determined that not only is the socket including the uncore in a low power state, but additional sockets of a multi-socket system are also in a low power state.

In one embodiment, MCG operation may include gating clock(s) of a significant portion of the logic in the uncore while ensuring that no in-flight transaction is lost. When no remaining in-flight transactions are present in the uncore, the MCG state may be entered at a conclusion of an MCG entry flow. In addition, MCG operation may include ungating the clock(s) of the uncore logic with minimal latency when an external request or internal or external event occurs, according to an MCG exit flow.

Figure 1:
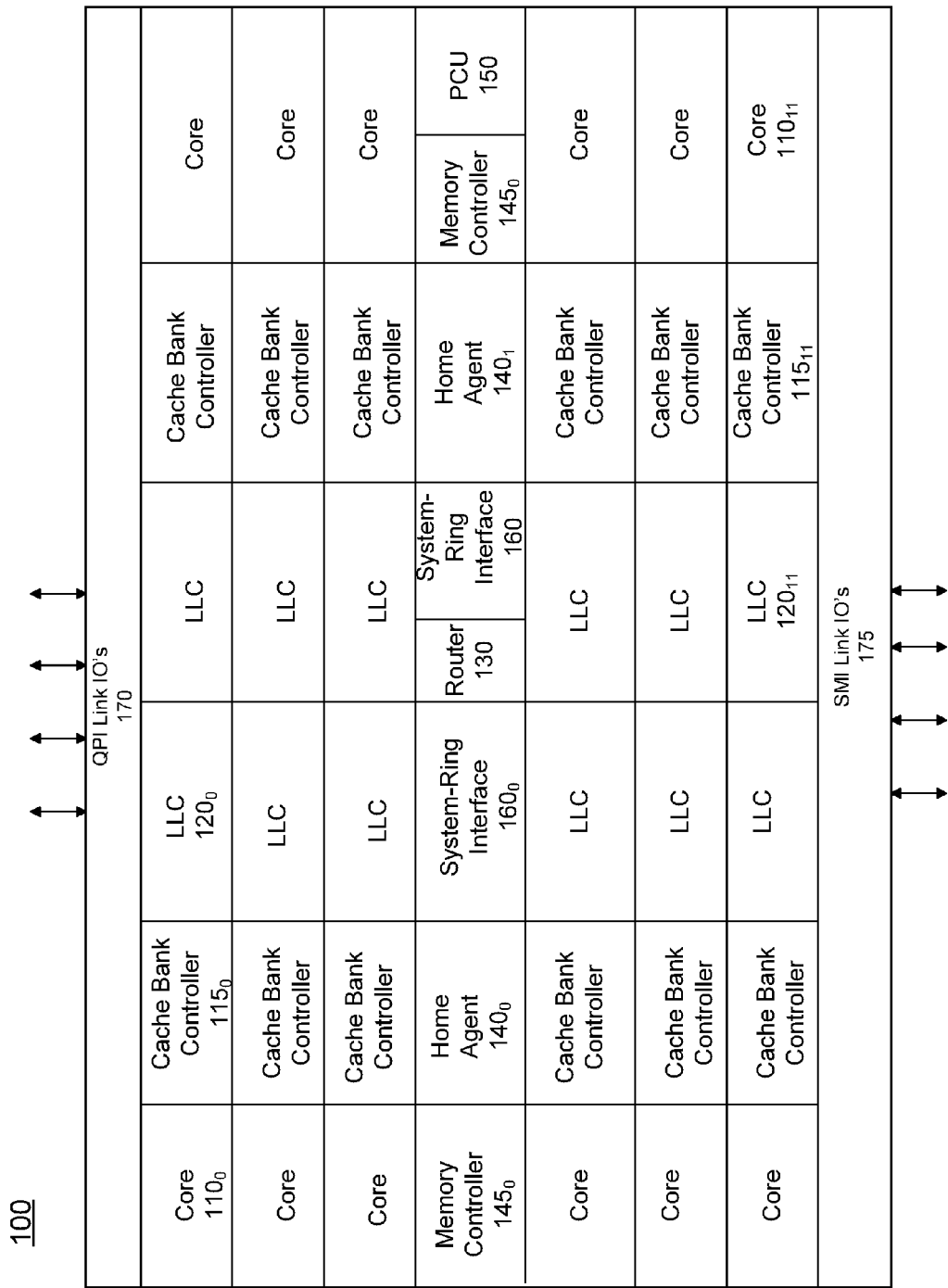
FIG. 1 is a block diagram of a processor in accordance with an embodiment of the present invention.

Referring now to FIG. 1, shown is a block diagram of a processor in accordance with an embodiment of the present invention. Specifically, FIG. 1 shows a processor 100, which is a multi-core processor and may be particularly appropriate for server-based applications. As seen, processor 100 includes a plurality of cores $110_0$-$110_{11}$. While shown with a specific number of cores in the embodiment of FIG. 1, understand that the scope of the present invention is not limited in this regard. Each core may be associated with a private storage, e.g., one or more levels of cache memory. In addition, each core is shown as being coupled to a slice of a shared cache memory, e.g., a last level cache (LLC) that is formed of a plurality of slices $120_0$-$120_{11}$, via corresponding cache bank controllers $115_0$-$115_{11}$.

As seen, communications via the different cores and caches may occur via a ring-based interconnect, which may be a bidirectional scalable ring interconnect 160a-b. To provide off-chip communications, a variety of different ports and agents may be present. Specifically as seen, a plurality of point-to-point (PtP) input/output (I/O) ports 170 may be present, in addition to memory I/O ports 175, which couple the socket to a local portion of system memory, e.g., dynamic random access memory (DRAM) coupled to the socket via a scalable memory interconnect (SMI). A cache coherence protocol can be implemented using various agents of the processor. In one embodiment, the PtP links may provide for communication in accordance with the Intel® Quick Path Interconnect (QPI) protocol, which is a cache coherent protocol that includes multiple layers including a physical layer, a link layer and a protocol layer. By using this protocol, coherent communications may be made in a system including multiple caching agents. According to one embodiment of the invention, a "caching agent" generally represents a cache logic that can request and cache copies of memory data (and modify the data). Such a caching agent may encompass a cache controller that is adapted to route memory requests. The protocol provides for various communications over multiple channels and virtual networks along low latency links that provide for communication between devices coupled together via a PtP link. Of course, the scope of the present invention is not limited in this regard and in other embodiments, the PtP links may be in accordance with another communication protocol.

As seen further in FIG. 1, a router 130 couples to a pair of home agents $140_0$-$140_1$ that in turn may communicate with corresponding memory controllers $145_0$-$145_1$. In turn, these memory controllers 145 may be coupled, e.g., via SMI interconnects via memory I/O ports 175 to local portions of a system memory, e.g., one or more dual in-line memory modules (DIMMs) coupled to the processor.

In the embodiment of FIG. 1, the uncore is thus composed generally of router 130, LLCs 120, cache bank controllers 115, home agents 140, system ring interface 160, memory controllers 145 and a power control unit (PCU) 150. Each of these units can be clocked by a common clock signal called the uncore clock. Although not shown for ease of illustration, understand that the uncore clock may be generated in clock generation circuitry of the uncore. MCG operation may essentially realize low dynamic power by gating of the uncore clock in certain units of the uncore. In one embodiment, several units of the uncore may remain powered on and active (with an active clock signal) during MCG mode. Namely, router 130 and PCU 150 can remain powered on, although additional or different units can be clock gated in other embodiments. In general, router 130 may be configured to route incoming QPI link packets to the appropriate on-chip destination. In addition, it also routes packets that are sent between on-chip units. Thus, incoming packets coming from external sockets as well as an I/O hub may be provided to an input port of router 130. Power control unit 150 may include a microcontroller or other control logic to sequence and control the MCG entry and exit process, in addition to handling other power management tasks such as core (and package) C-state entry and exit. While shown with this particular implementation in the embodiment of FIG. 1, understand the scope of the present invention is not limited in this regard, and a multi-core processor may have a different arrangement in other embodiments.

Note that the term "device" or "agent" is general and may be used to describe any electrical component coupled to a link. A "link" or "interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

Figure 2:
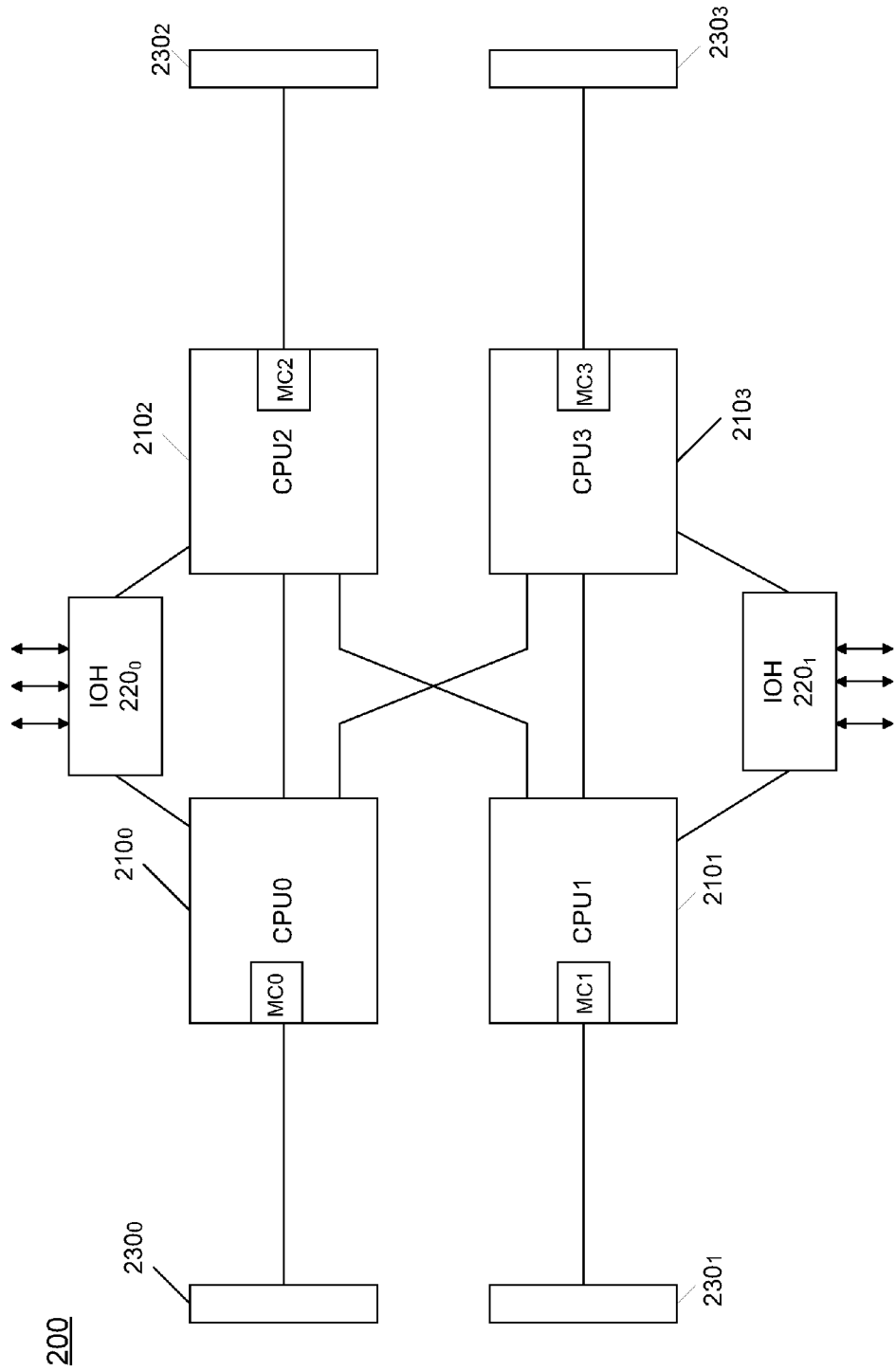
FIG. 2 is a block diagram of a multiprocessor system in accordance with one embodiment of the present invention.

Embodiments may be used in many different system types. In certain implementations, the system may be a multi-socket system such as a multiprocessor server having a non-uniform memory architecture (NUMA). Referring now to FIG. 2, shown is a block diagram of a system in accordance with one embodiment of the present invention. As seen in FIG. 2, a system 200 includes a plurality of sockets $210_0$-$210_3$. Each socket may include a multi-core processor such as described above with regard to FIG. 1, although other implementations are certainly possible. Each socket may be coupled to the other sockets by way of a PtP link.

As seen in FIG. 2, each processor 210 may generally be referred to as a central processing unit (CPU). As further seen, each processor 210, which corresponds to a multi-core socket or package such as the FIG. 1 embodiment, includes an integrated memory controller to interface via a memory interconnect with a local portion of a system memory 230. As seen, each processor $210_x$ may communicate via a memory interconnect with a corresponding portion $230_x$ of system memory which, in various embodiments can be implemented as DRAM. To provide an interface to other components of a system such as various peripheral devices, each of processors 210 may be coupled to at least one I/O hub. Specifically, processors $210_0$ and $210_2$ may be coupled to I/O hub $220_0$ and similarly, processors $210_1$ and $210_3$ may be coupled to I/O hub $220_1$. Although shown with this basic high level view in the embodiment of FIG. 2, understand the scope of the present invention is not limited in this regard.

In general, the MCG entry process may be initiated when it is determined that not only the socket in which the uncore is located, but all other sockets a multi-socket system are in a given low power state. This is so, since if the MCG were allowed to be entered only when the given socket in a low power state, it is likely that transactions would be incoming from other sockets such that either it is not possible to complete the entry flow into the MCG, or that the expense of entering the MCG is not worth a small possible window in which the uncore can be in an MCG state.

More specifically, in an embodiment, before entry into an MCG state is permitted to begin via an MCG entry flow, a variety of preconditions first can be established. First, for the given socket, all cores are in a predetermined low power state, e.g., a C3 or C6 sleep state of the ACPI specification. For purposes of illustration and not limitation, embodiments are described herein with regard to these C3 and C6 sleep states, although other sleep states are contemplated. Once all the cores are in the C6 or C3 state, the power control unit in the uncore will essentially try to enter a low power idle state for the entire socket called "package C6" (in the case where cores are in C6) or "package C3" (in the case when cores are in C3).

The MCG state can be entered as an extension to the package C3 and package C6 entry process. Thus the MCG state is in essence an uncore idle power reduction while in a package C6 or package C3 state. Note however the MCG state may be independent of the ACPI specification, since the current ACPI specification does not provide for this state. In other embodiments for use with different low power states, understand that the MCG state may be entered/exited independently of any operating system (OS) power control, and may instead be controlled by a microcontroller of a processor such as the uncore PCU.

As another precondition to entry into the MCG state, all other sockets in the platform are in (or entering into) the package C3 or package C6 state. To enable this state of common low power state presence, a negotiation process may occur between the various sockets such that the package C6 and/or package C3 entry is coordinated and agreed upon between all the sockets as well as the I/O hubs.

This ensures that all the sockets enter package C6 or package C3 together, so that time spent in the MCG state is maximized. As a still further precondition to the MCG state, the memory subsystem also may have entered a low power state, which in one embodiment is referred to as a "SMI kill" state, to indicate that a SMI link is inactive. This low power state ensures that the memory controller and home agent logic can be clock gated. When these preconditions have been met, an MCG entry flow may be initiated in the uncore of the various sockets to attempt to place each uncore into an MCG state.

In one embodiment, in the MCG state, various circuitry of the uncore, including uncore units such as the cache bank controllers, home agents, memory controllers, and the system ring interface units can all be gated. This gating can be done at a regional clock buffer level, thereby avoiding the complexities of fine grain gating schemes.

Once these preconditions are met, the MCG entry can proceed. Note that due to the sheer physical size of the uncore, in different embodiments the clock gating process itself can take a varying number of uncore clock cycles (e.g., between approximately 10-20 cycles). This is to ensure that the clock gate signal can reach all the units to be gated. For the clock gating process to occur safely, various mechanisms may be provided. As one example, each unit of the uncore may generate an emptiness indicator or an "empty" signal to indicate its emptiness status. This status thus indicates that the corresponding unit does not have any transactions in-flight inside. The emptiness of all the uncore units can be logically AND'ed together to determine the emptiness status of the uncore as a whole. In one embodiment, the logical AND'ing may be performed in the PCU, although the scope of the present invention is not limited in this regard.

In addition, the MCG entry flow may use a mechanism to flow control incoming transactions. That is, once the decision to clock gate has been made, no new transaction should be sent to a unit being clock gated. This flow control can be implemented by ensuring that all incoming transactions are blocked from entering into the units that are clock gated. In one embodiment, this flow control mechanism may be located within the router of the uncore to ensure that all transactions coming in from an off-chip interface such as various PtP interconnects to other sockets (or I/O hub) are blocked until the clock gating is done safely. As an example, the router can send a flow control signal via the off-chip interconnect to other sockets/I/O hubs to restrict the sending of transactions to the socket.

Yet another mechanism to be used during MCG entry flow is to ensure that transactions coming in from an out of band (OOB) interface are not lost due to clock gating. To accommodate this functionality, in one embodiment, any new incoming OOB transactions that seek an access into a clock gated logic can essentially be not acknowledged (NACK'ed) so that they will be retried at a later time. Note that OOB transactions that do not need to access into the clock gated logic may be allowed to proceed and complete normally. One example of such a transaction is a query to the PCU regarding die temperature.

Figure 3:
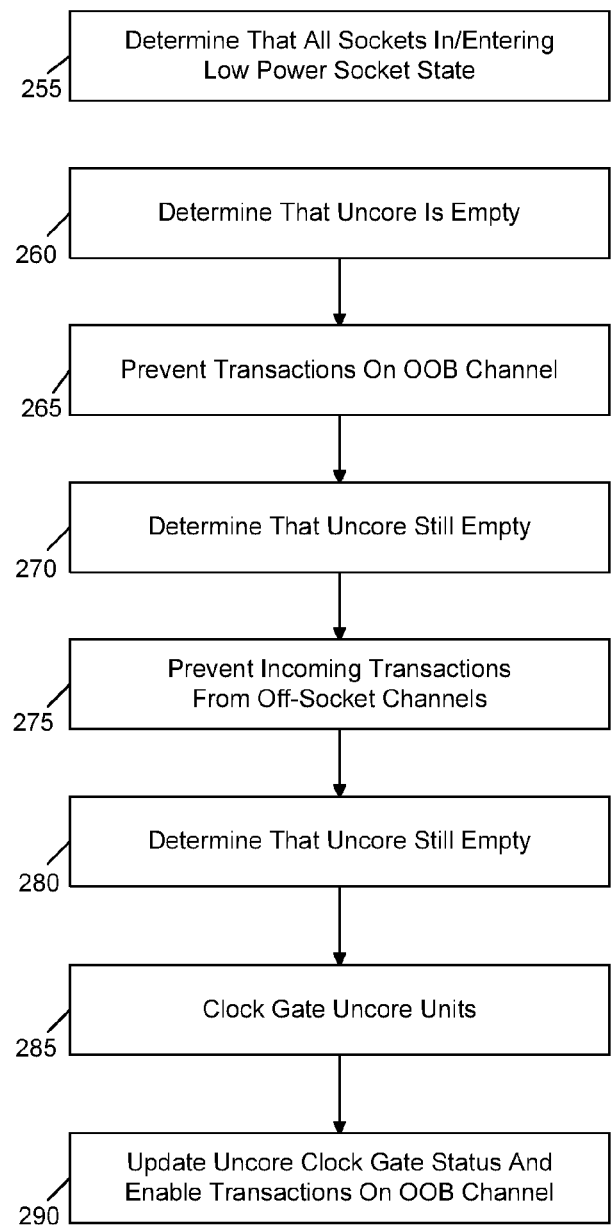
FIG. 3 is a flow diagram of a method for entering into a macro clock gating state in accordance with an embodiment of the present invention.

Now referring to FIG. 3, shown is a flow diagram illustrating various operations performed in entering into an MCG state in accordance with an embodiment of the present invention. As shown in FIG. 3, method 250 may be implemented, e.g., in control logic of an uncore, which in some embodiments can be part of a PCU of the uncore. In general, method 250 may proceed by determining that it is appropriate to seek entry into the MCG state, and taking actions to enter into the state when it is determined that the uncore has been empty for multiple determined amounts of time, which can correspond to various timer timeouts. As seen in FIG. 3, method 250 may begin by determining that all sockets are either in or are entering a low-power socket state, for example, a given C-state such as a C3 or C6 package state (block 255). This determination may be based on the results of a negotiation between the sockets of a platform. Next, it may be determined that the uncore is empty (block 260). That is, this determination means that there are no pending transactions within the various units of the uncore, which may be identified by the logical AND'ing of empty signals from all logic units of the uncore. Next, transactions on an OOB channel can be prevented (block 265). Various mechanisms to prevent such transactions from being received during an MCG event will be discussed further below. Control then passes to block 270, where it may be determined whether the uncore is still empty.

When this determination is valid, control passes to block 275 where incoming transactions can be prevented from coming in from off-socket channels such as various PtP interconnects which are connected to the socket. Yet again at block 280, it can be determined that the uncore is still empty. This is thus an indication that there are no pending transactions, and it is appropriate to enter into the MCG state. Accordingly, control passes to block 285, where the various uncore units can be clock gated. Different mechanisms for performing this clock gating will be discussed further below. Finally, at block 290, an uncore clock gate status can be updated to indicate that the uncore is in an MCG state and furthermore at this point, transactions on the OOB channel can be enabled. That is, because the uncore is now in the clock gated state, such transactions are enabled so that when uncore logic is needed to handle an OOB transaction, the MCG state can be exited. Although shown with this high level in the implementation of FIG. 3, understand that the scope of the present invention is not limited in this regard. For example, although shown with a linear flow, understand that a determination of uncore emptiness at various points during the flow can cause the MCG entry flow to be restarted, or certain operations re-tried.

Referring now to FIG. 4, shown is a flow diagram of operations according to an MCG entry flow in accordance with an embodiment of the present invention. As shown in FIG. 4, method 300 may be implemented by MCG logic, e.g., within the PCU of the uncore. Note that as a condition precedent to MCG entry, at block 310 it may be determined that all cores in the package are in a selected low-power state, and the same is true for all processor sockets (or are in the process of entering into the selected low power state). In addition, it may be determined that a memory coupled to the processor is also in a low-power state, e.g., a self-refresh state, as indicated by a low power memory interconnect state (e.g., an active SMI kill signal).

When this is the case, conditions have been established to enter into an MCG state. Accordingly, a first phase of MCG entry may be performed. First at diamond 315 it may be determined whether the uncore is empty. If so, control passes to block 320 where an OOB interface can be drained and various control signals set, along with a timer initialization (block 320). More specifically, in this first phase, a bit called "NACK Enable" is set to force the OOB interface start NACK'ing all transactions that seek an access to logic that is going to be clock gated, and all in-flight OOB transactions that seek such access are drained (e.g., by handling the transactions as appropriate). In one embodiment, the OOB interface has a signal called "NACK Request" that when asserted can force an MCG exit. The assertion of this signal is disabled at this point also. Then the uncore empty is continuously sampled for a certain programmable amount of time called the empty persistence time to ensure that uncore is persistently empty. This time can be tracked by a timer called a persistence timer that is thus initialized at this block 320. The length of the persistence timer may be programmable, and in one embodiment can be between approximately 50 and 1000 cycles. In one embodiment, this and other timers to be discussed may be present in the PCU.

Once this time period is over and the uncore empty status signal has stayed asserted for the entire empty persistence time without any de-assertion event (even for a single uncore clock cycle), as determined at diamond 325 a second phase of the MCG entry flow is triggered. Note that if this uncore empty signal is sampled de-asserted at any instant during the first phase, the entry process is abandoned and the OOB NACK enable is reset (with the flow indicated at diamond 330 and block 335).

In this second phase, and assuming that the uncore is still empty as determined at diamond 340, control passes to block 350 where a flow control mechanism may be enabled. More specifically, QPI links can be flow controlled and prevented from sending in any new packets beyond the router input port. In this phase also, the uncore empty signal is continuously sampled for a certain programmable amount of time called the "drain time". This time can be tracked by a timer called a "drain timer". The length of the drain timer may be programmable, and in one embodiment can be between approximately 50 and 1000 cycles. This second phase essentially allows any in-flight transaction that arrived just before the flow control signal was asserted to proceed safely and eventually de-assert the uncore empty signal. Note that this incoming signal causes a de-assertion of uncore empty signal and thus causes the overall MCG entry flow to restart. Once this time period is over and the uncore empty status signal has stayed asserted for the entire "drain time" without any de-assertion event even for a single uncore clock cycle (as determined at diamonds 360 and 375 in the affirmative), then a third phase is triggered. If the uncore empty status signal is sampled de-asserted at any instant during the second phase (as determined at diamonds 365 or 375), the entry process is abandoned and the NACK enable is reset and QPI link flow control is de-asserted (at blocks 370 and 335).

In this third and final phase of the MCG entry flow, the actual clock gate signal is asserted at block 380. In addition, to accommodate for propagation delay of the clock gate signal to reach units that are relatively far away from the clock gate signal generation, a "clock gate" timer is started and the clock gating is considered completed when this timer expires. The length of the clock gate timer may be programmable, and in one embodiment can be between approximately 10 and 30 cycles. Once this timer expires (as determined at diamond 385), the MCG entry is considered as done, and a status signal called "uncore clock gated" is set at block 390. Once this status signal is set, the OOB interface can force an MCG exit (and thus return the system to clock ungating) by asserting the "CLK Req" signal. Note that the "CLK Req" signal has relevance only while the "Uncore Clock Gated" status signal is set (namely, only when the clocks are gated). Also at block 390, the "NACK Enable" signal is de-asserted as well. Thus as this point, the uncore may be in an MCG low power state in which all uncore units except for the router and PCU are clock gated, thus reducing dynamic power consumption. The uncore may remain in this state until a given event or occurrence triggers an exit.

In general, the exit from the clock gated or MCG state can occur on one of multiple conditions. In one embodiment, a first condition may be when a new transaction is received via one of the QPI links into the router input port, that in turn results in de-assertion of the uncore empty signal. And a second condition may be when a new OOB transaction that uses a unit not having an uncore clock is received, and thus causes assertion of the "OOB Clk Req" signal.

Figure 5:
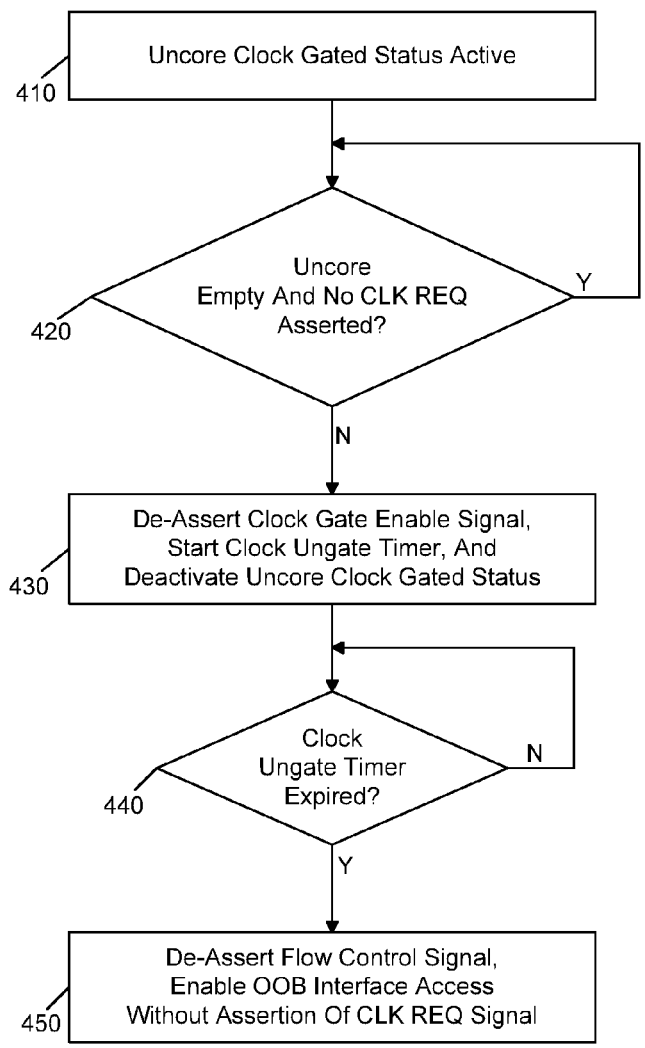
FIG. 5 is a flow diagram of a macro clock gating exit flow in accordance with one embodiment of the present invention.

Referring now to FIG. 5, shown is a flow diagram of an MCG exit flow in accordance with one embodiment of the present invention. As shown in FIG. 5, exit flow 400 may similarly be implemented via MCG control logic of a PCU, in one embodiment. As seen in FIG. 5, method 400 may occur when the MCG state is active, in other words an uncore clock gated status signal is active (block 410). It may then be determined at diamond 420 whether the uncore is empty and no clock request has been asserted. If so, the uncore remains in the MCG state. Otherwise control passes to block 430. At block 430, a clock gate enable signal may be de-asserted, and a clock ungate timer may be initiated. In addition, the uncore clock gated status signal may be de-activated. Note that the clock ungating process can take a certain amount of clock cycles to be realized. This ungating time may be referred to as the "clock ungate" time. In one embodiment, this time interval can be tracked using a "clock ungate" timer. The length of the clock ungate timer may be programmable, and in one embodiment can be between approximately 10 and 30 cycles. Although the scope of the present invention is not limited in this regard, once this timer expires (as determined at diamond 440), the link flow control signal can be de-asserted, and the "uncore clock gated" signal is reset (at block 450). This removes the need for the Clk Req signal, as the OOB interface can now access all units of the uncore without any restrictions. Although shown with this particular implementation in the embodiment of FIG. 5, understand the scope of the present invention is not limited in this regard.

Figure 6:
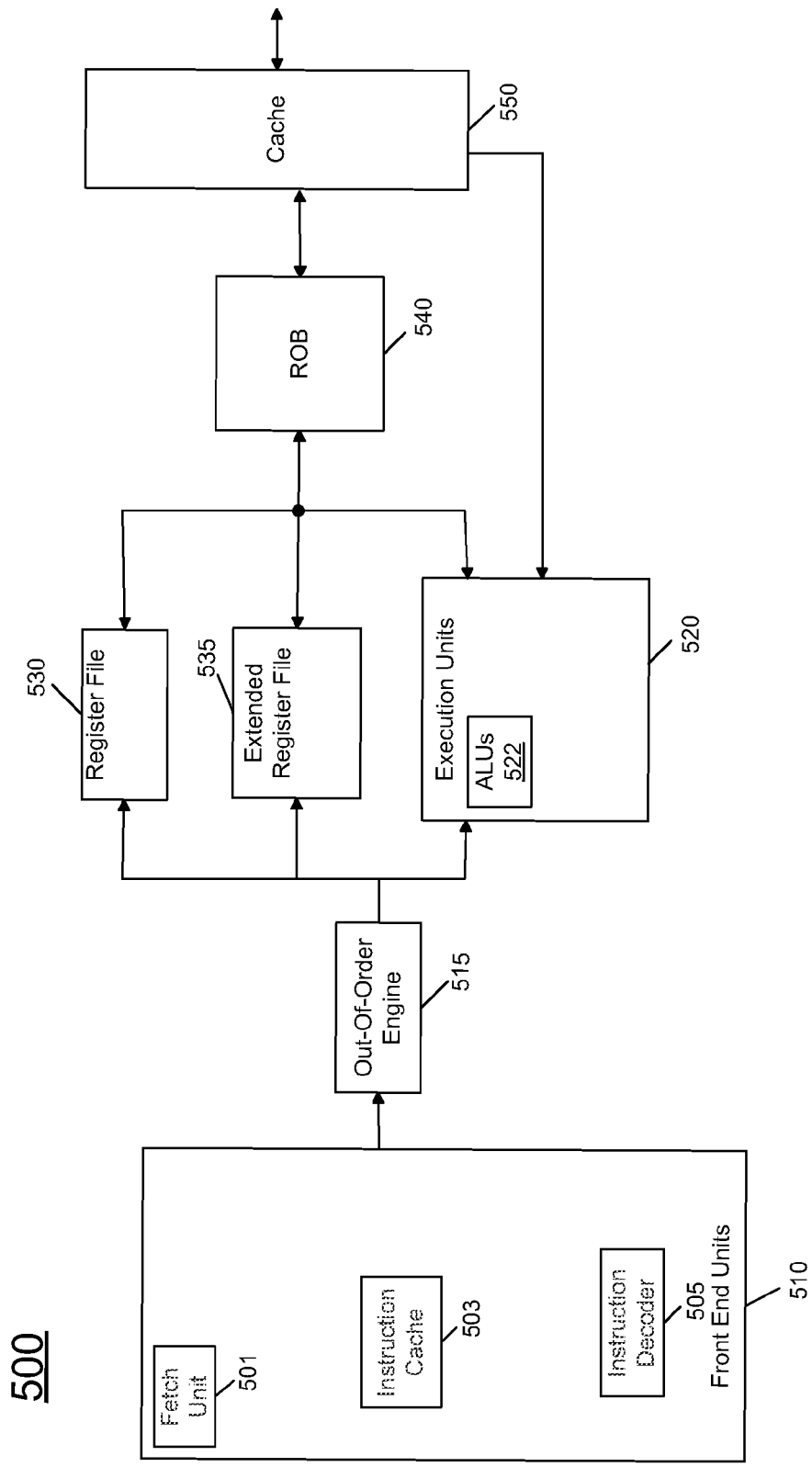
FIG. 6 is a block diagram of a processor core in accordance with one embodiment of the present invention.

Embodiments can be used in multi-core processors with varying core architectures. Referring now to FIG. 6, shown is a block diagram of a processor core in accordance with one embodiment of the present invention. As shown in FIG. 6, processor core 500 may be a multi-stage pipelined out-of-order processor, and can be one of multiple cores present and which may be in a lower power state (e.g., a C3 or C6 state) before an associated uncore begins an MCU entry flow.

As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. Instead cores can be implemented as an in-order processor, a reduced instruction set computing (RISC) processor such as an ARM-based processor, or a processor of another type of ISA that can emulate instructions and operations of a different ISA via an emulation engine and associated logic circuitry.

Figure 7:
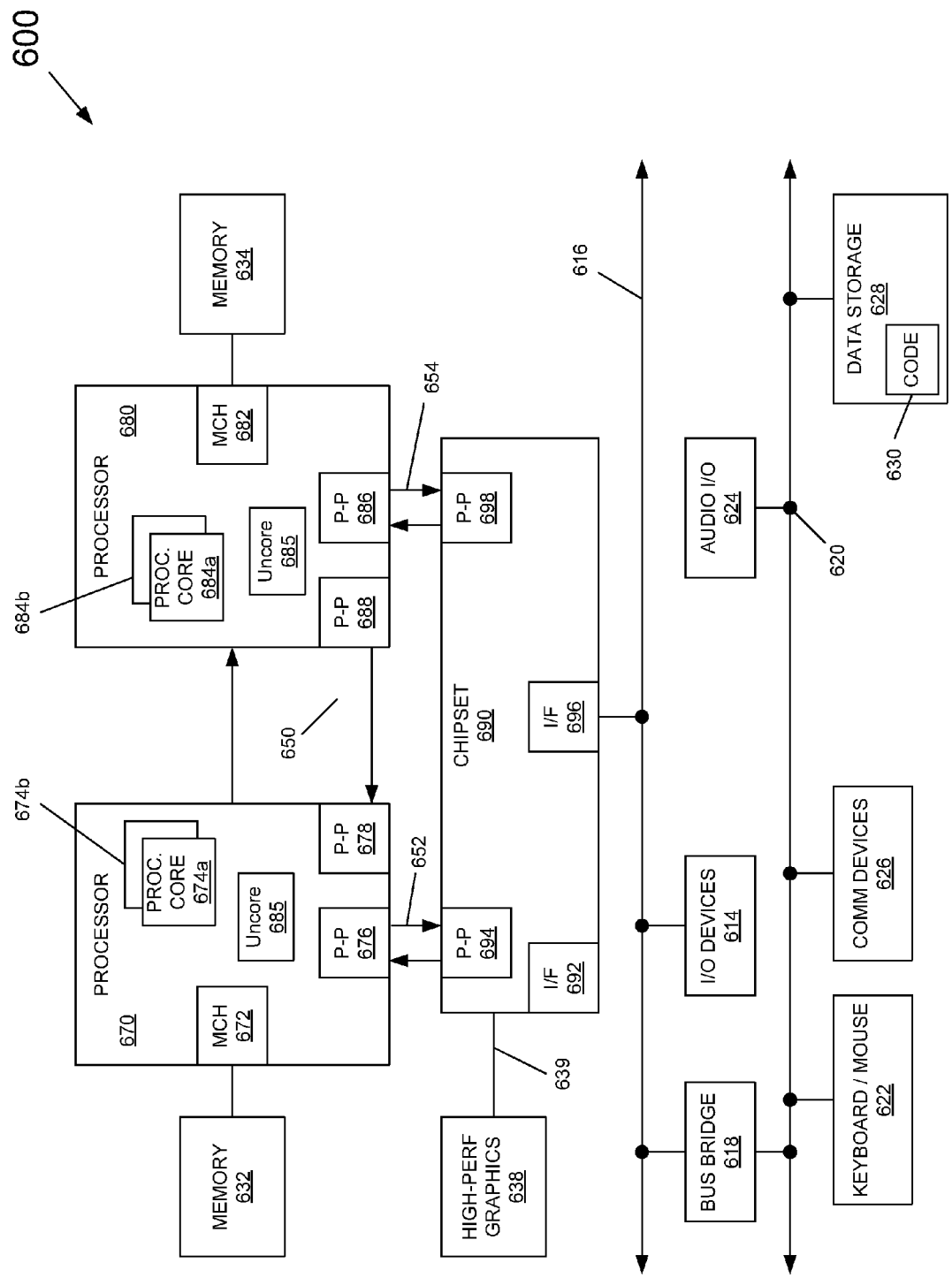
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be many-core processors, including first and second processor cores (i.e., processor cores 674a and 674b and processor cores 684a and 684b), although potentially many more cores may be present in the processors. In addition each processor may include an uncore 675 and 685 to perform MCG flows in accordance with an embodiment of the present invention.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a storage medium having stored thereon instructions which can be used to program a system to perform the instructions. The storage medium may include, but is not limited to, any type of non-transitory storage medium such as a disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a plurality of cores; and
    an uncore including at least one shared cache memory, a plurality of logic units including a memory controller, a router, and a power control unit (PCU), wherein the PCU is to clock gate at least one of the plurality of logic units and the at least one shared cache memory when the processor is in a low power state, after a plurality of time periods have occurred in which the plurality of logic units were persistently empty of transactions and no in-flight transactions were present in the plurality of logic units, the PCU including a plurality of timers each to track a different time period and the clock gate is to occur if the uncore has been persistently empty for at least each of the different time periods and prevent incoming transactions from one or more off-socket channels, wherein the uncore is to determine whether the plurality of logic units were persistently empty for a first time period and prevent transactions from an out-of-band (OOB) channel and determine whether the plurality of logic units were persistently empty for a second time period.

2. The processor of claim 1, wherein the PCU is to perform the clock gating when a multi-core processor of a multiprocessor system including the processor is in the low power state.

3. The processor of claim 1, wherein if the plurality of logic units are not persistently empty for the plurality of time periods, the PCU is to determine if the plurality of logic units are persistently empty for a second iteration of the plurality of time periods, and to perform the clock gating if the plurality of logic units are persistently empty for the second iteration.

4. The processor of claim 1, wherein the PCU and the router are to remain clocked when the at least one logic unit is clock gated.

5. The processor of claim 1, wherein the PCU is to terminate the clock gating when the uncore is not empty or when an incoming transaction is received via the OOB channel.

6. The processor of claim 1, wherein the PCU is to execute an entry flow to the clock gate state, the entry flow to prevent incoming transactions from being received in the processor.

7. The processor of claim 6, wherein the PCU is to enable the incoming transactions after the entry flow and during the clock gate state.

8. The processor of claim 1, further comprising a ring interconnect to couple the plurality of cores and the at least one shared cache memory.

9. A non-transitory machine-readable medium having stored thereon instructions, which if performed by a machine cause the machine to perform a method comprising:
    determining whether a plurality of processor sockets have negotiated to enter a socket low power state and determining that an uncore of a first processor socket of the plurality of processor sockets is empty;
    if so, preventing transactions from an out-of-band (OOB) channel coupled to the uncore and determining whether the uncore is still empty after a first time period;
    if so, preventing incoming transactions from one or more off-socket channels coupled to the uncore and determining whether the uncore is still empty after a second time period; and
    clock gating a plurality of units of the uncore responsive to determining that the uncore is still empty after the second time period.

10. The non-transitory machine-readable medium of claim 9, wherein the method further comprises updating an uncore clock gate status signal to indicate that the uncore is in a clock gated state responsive to the clock gating and enabling transactions on the OOB channel so that the clock gating can be disabled responsive to an incoming transaction on the OOB channel.

11. The non-transitory machine-readable medium of claim 9, wherein the method further comprises initiating a persistence timer to count the first time period, and determining after the first time period whether the uncore has been persistently empty for the first time period.

12. The non-transitory machine-readable medium of claim 11, wherein if the uncore has not been persistently empty for the first time period, the method further comprises enabling transactions on the OOB channel.

13. The non-transitory machine-readable medium of claim 11, wherein the method further comprises initiating a drain timer to count the second time period, and determining after the second time period whether the uncore has been persistently empty for the second time period.

14. The non-transitory machine-readable medium of claim 13, wherein if the uncore has not been persistently empty for the second time period, the method further comprises enabling the incoming transactions from the one or more off-socket channels and enabling transactions on the OOB channel.

15. The non-transitory machine-readable medium of claim 13, wherein the method further comprises asserting a clock gate enable signal and initiating a clock gate timer, and setting a status indicator to indicate the clock gating responsive to an expiration of the clock gate timer.

16. The non-transitory machine-readable medium of claim 15, wherein the method further comprises:
continuing the clock gating while the uncore remains empty and no request signal has been received via the OOB channel, and otherwise de-asserting the status indicator and the clock gate enable signal; and
responsive to the de-assertion, initiating a clock ungate timer and on expiration of the clock ungate timer, de-asserting a flow control signal that prevents the incoming transactions from the one or more off-socket channels.

17. A system comprising:
a first multi-core processor having a first plurality of cores, a first uncore, and a first plurality of link interfaces;
a second multi-core processor having a second plurality of cores, a second uncore, and a second plurality of link interfaces, wherein when the first multi-core processor and the second multi-core processor have negotiated to enter a package low power state, the second uncore is to clock gate at least a portion of the second uncore according to a macro clock gating (MCG) protocol having a MCG entry flow and a MCG exit flow, the MCG protocol independent of operating system power control, wherein the second uncore includes a power control unit (PCU) to perform the clock gating after a plurality of time periods have occurred in which the second uncore is persistently empty of transactions, the PCU including a plurality of timers each to track one of the plurality of time periods, and the second uncore is to prevent transactions from an out-of-band (OOB) channel coupled to the second multi-core processor and thereafter initiate a first of the plurality of timers to count a first time period, and after the first time period to prevent incoming transactions from one or more off-socket channels coupled to the second multi-core processor and thereafter initiate a second one of the plurality of timers to count a second time period, and after the second time period to cause the clock gating to occur; and
a dynamic random access memory (DRAM) coupled to the first and second multi-core processors according to a non-uniform memory architecture.

18. The system of claim 17, wherein the system comprises a multiprocessor system.

\* \* \* \* \*